United States Patent
Tiwary et al.

(10) Patent No.: US 11,392,357 B2
(45) Date of Patent: Jul. 19, 2022

(54) DELEGATING BYTECODE RUNTIME COMPILATION TO SERVERLESS ENVIRONMENT

(71) Applicant: SAP SE, Walldorf (DE)

(72) Inventors: Mayank Tiwary, Rourkela (IN); Nishii Bharill, Bangalore (IN); Shashank Mohan Jain, Karnataka (IN)

(73) Assignee: SAP SE, Walldorf (DE)

( * ) Notice: Subject to any disclaimer, the term of this patent is extended or adjusted under 35 U.S.C. 154(b) by 3 days.

(21) Appl. No.: 16/714,300

(22) Filed: Dec. 13, 2019

(65) Prior Publication Data

US 2021/0182040 A1    Jun. 17, 2021

(51) Int. Cl.
    *G06F 9/445*    (2018.01)
    *G06F 8/41*    (2018.01)
    *G06F 9/455*    (2018.01)

(52) U.S. Cl.
    CPC ........ *G06F 8/4434* (2013.01); *G06F 9/45508* (2013.01); *G06F 8/41* (2013.01); *G06F 8/441* (2013.01)

(58) Field of Classification Search
    CPC ........ G06F 8/41; G06F 8/4441; G06F 8/4434; G06F 9/45508
See application file for complete search history.

(56) References Cited

U.S. PATENT DOCUMENTS

2015/0278513 A1* 10/2015 Krasin ................. G06F 9/4881
    726/30

FOREIGN PATENT DOCUMENTS

WO    WO-02065284 A1 *  8/2002  ......... G06F 9/45508

OTHER PUBLICATIONS

Rean Griffith and Gail Kaiser, A Runtime Framework for Native C and Bytecode Applications, IEEE, 2006, retrieved online on Feb. 10, 2021, pp. 93-103. Retrieved from the Internet: <URL: https://ieeexplore.ieee.org/stamp/stamp.jsp?tp=&arnumber=1662386&tag=1>. (Year: 2006).*

(Continued)

*Primary Examiner* — Hanh Thi-Minh Bui
(74) *Attorney, Agent, or Firm* — Fountainhead Law Group P.C.

(57) ABSTRACT

A host delegates Just-In-Time (JIT) bytecode compilation to a serverless Web Assembly (WASM) runtime. The WASM runtime receives the bytecode, together with any additional arguments (e.g.: offsets of dependent functions, vtable metadata, virtual machine state). The host may include a parser to provide the additional arguments. In response to receiving the bytecode and arguments, the WASM runtime triggers a thread and loads appropriate WASM modules to compile the bytecode. The resulting assembly instructions are sent back to the host for execution in connection with the (frequently requested) method. Only the bytecode of frequently-accessed methods (as determined at the host) may be delegated for compilation. Delegation of bytecodes for compilation according to embodiments, may conserve a significant percentage of CPU cycles at the host, which can then be used for executing code instead. Based upon analysis of historical compilation activities, particular embodiments may proactively implement speculative loading of additional WASM modules.

14 Claims, 5 Drawing Sheets

(56) References Cited

OTHER PUBLICATIONS

Phani Kishore Gadepalli et al., Challenges and Opportunities for Efficient Serverless Computing at the Edge, IEEE, 2019, retrieved online on Feb. 10, 2021, pp. 261-266. Retrieved from the Internet: <URL: https://ieeexplore.ieee.org/stamp/stamp.jsp?tp=&arnumber=9049531&tag=1>. (Year: 2019).*

* cited by examiner

DELEGATING BYTECODE RUNTIME COMPILATION TO SERVERLESS ENVIRONMENT

BACKGROUND

Unless otherwise indicated herein, the approaches described in this section are not prior art to the claims in this application and are not admitted to be prior art by inclusion in this section.

As part of Product as a Service (PaaS) offerings, a Java application may be provisioned through a Java Virtual Machine (JVM) or other container. However, a computer running such a Java application may experience loss of a significant percentage of CPU cycles due to operation of a Just-in-Time (JIT) compilation environment.

In particular, the JIT environment performs runtime compilation of bytecodes to highly optimized machine dependent assembly instructions. Typically, the JVM takes in bytecode, places it into memory along with the dependencies, and executes the bytecode by interpretation. That is, the JVM interprets the bytecode whenever a function is executed. However, if a particular method is in high demand by a runtime process, such repeated operations can undesirably consume valuable processing resources.

SUMMARY

A host delegates Just-In-Time (JIT) bytecode compilation to a serverless Web Assembly (WASM) runtime. The WASM runtime receives the bytecode, together with any additional arguments (e.g.: offsets of dependent functions, vtable metadata, virtual machine state). The host may include a parser to provide the additional arguments. In response to receiving the bytecode and arguments, the WASM runtime triggers a thread and loads appropriate WASM modules to compile the bytecode. The resulting assembly instructions are sent back to the host for execution in connection with the (frequently requested) method. Only the bytecode of frequently-accessed methods (as determined at the host) may be delegated for compilation. Delegation of bytecodes for compilation according to embodiments, may conserve a significant percentage of CPU cycles at the host, which can then be used for executing code instead. Based upon analysis of historical compilation activities, particular embodiments may pro-actively implement speculative loading of additional WASM modules.

The following detailed description and accompanying drawings provide a better understanding of the nature and advantages of various embodiments.

DETAILED DESCRIPTION

Described herein are methods and apparatuses implementing runtime compilation of bytecodes. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Typically, a JVM may execute bytecode either by interpreting the bytecode every time a function is executed, or by compiling the bytecode once via a JIT environment, and then reusing the compiled assembly instructions multiple times.

The latter approach may be employed when the JVM declares a method to be frequently used beyond a certain threshold. That is, the JVM asks JIT to perform a single compilation of the hot bytecode into highly optimized assembly instructions.

The JIT has two compilers. A first compiler is positioned at a client. The first compiler is light-weight and may be used in testing, to perform a minimal set of optimizations over the bytecode.

A second compiler of the JIT is typically located at the server. This second compiler (popularly known as opto) performs compilation of the bytecode and produces highly optimized code. The opto generally operates with around 250 to 300 optimizations over the bytecode. As noted above, such operation can be computationally intensive, undesirably consuming many CPU cycles.

Accordingly, embodiments implement delegation of Just-In-Time (JIT) bytecode compilation to a serverless Web Assembly (WASM) runtime. The WASM runtime receives the bytecode, together with any additional arguments (e.g.: offsets of dependent functions, vtable metadata, virtual machine state). The host may include a parser to provide the additional arguments. In response to receiving the bytecode and arguments, the WASM runtime triggers a thread and loads appropriate WASM modules to compile the bytecode. The resulting assembly instructions are sent back to the host for execution in connection with the (frequently requested) method. Only the bytecode of frequently-accessed methods (as determined at the host) may be delegated for compilation. Delegation of bytecodes for compilation according to embodiments, may conserve a significant percentage of CPU cycles at the host, which can then be used for executing code instead. Based upon analysis of historical compilation activities, particular embodiments may pro-actively implement speculative loading of additional WASM modules.

Figure 1:
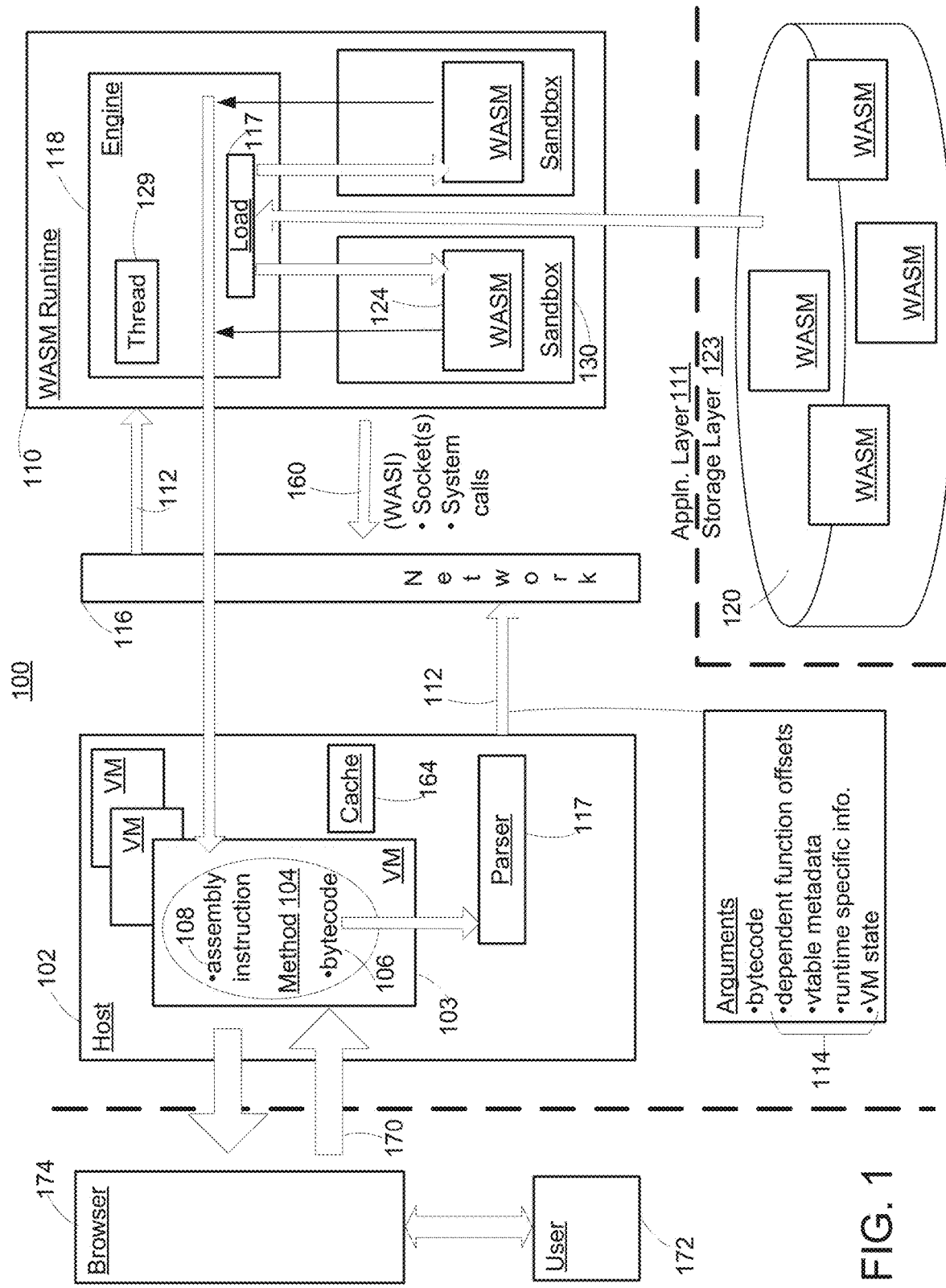
FIG. 1 shows a simplified diagram of a system according to an embodiment.

FIG. 1 shows a simplified view of an example system that is configured to implement bytecode compilation according to an embodiment. Specifically, system 100 comprises a host 102 that includes virtual machine 103.

Upon receipt of a request 170 from a user 172 (typically via a browser 174) the virtual machine is configured to perform a particular method 104. That method is expressed in a bytecode 106.

In order to perform the method, the bytecode needs to be compiled into an assembly instruction 108 of a higher level language. An example of such a higher level language is JAVA.

As noted above, compilation of the bytecode into an assembly instruction can be time-consuming process, involving possibly on the order of hundreds of optimizations. According, embodiments seek to delegate that bytecode compilation activity to a separate WASM runtime 110 (here, present in an application layer 111).

In particular, the host communicates an input 112 comprising the bytecode and any additional arguments 114, to the WASM runtime via a network 116. Examples of such additional arguments can include but are not limited to:
- offsets of dependent functions;
- metadata of the vtables,
- runtime specific information,
- VM state, and
- others.

As described later below in connection with the example, this input to the WASM runtime may be the result of operation of a parser 117.

The WASM runtime receives the input from the network. According to some embodiments, the network can be external to a device in which the host resides. For example the network can communicate outside to a remote device that is responsible for executing JITaaS for a variety of tenants.

Alternatively, the network could be internal to the device in which the host resides. For example, in certain embodiments the WASM runtime can operate on the bare operating system of a computer that is also running the host.

Loading component 117 of engine 118 loads from a database 120 of a storage layer 122, WASM module(s) 124 relevant to compilation of the bytecode. As described later below, in certain embodiments this loading can be static—based on the bytecode and the additional arguments.

Alternatively or in conjunction with static loading, WASM modules may be retrieved from storage based upon speculative loading. Such a speculative loading approach considers additional context information associated with the instant bytecode.

For example, the speculative loading may summon additional WASM modules from a logical volume in expectation of imminent need, based upon historic association between the instant bytecode and other WASM modules. Such a forward-looking loading approach, can reduce delays associated with loading and desirably increase bytecode compilation speed.

Based upon an initial single thread 129, the WASM module is loaded into a Sandbox 130 compilation environment of the WASM runtime. That sandbox environment is segregated from other sandboxes including other WASM modules (e.g., as may be loaded for the purpose of compiling methods from other tenants).

The WASM module operates in the Sandbox of the WASM runtime to compile the received bytecode into an assembly instruction. An interface with the sandbox environment—e.g., a Web-Assembly System Interface (WASI)—communicates 160 the executable instruction back to the host via the network. Such communication by the WASI may be conducted via sockets or system calls.

Upon receipt of the assembly instruction 108 returned from the WASM runtime over the network, the host can perform the method in the high-level language and return results thereof to the user.

It is noted that the host may include a cache 164. That cache can be useful for storing one or more of:
- parsing results;
- assembly instructions.

Figure 2:
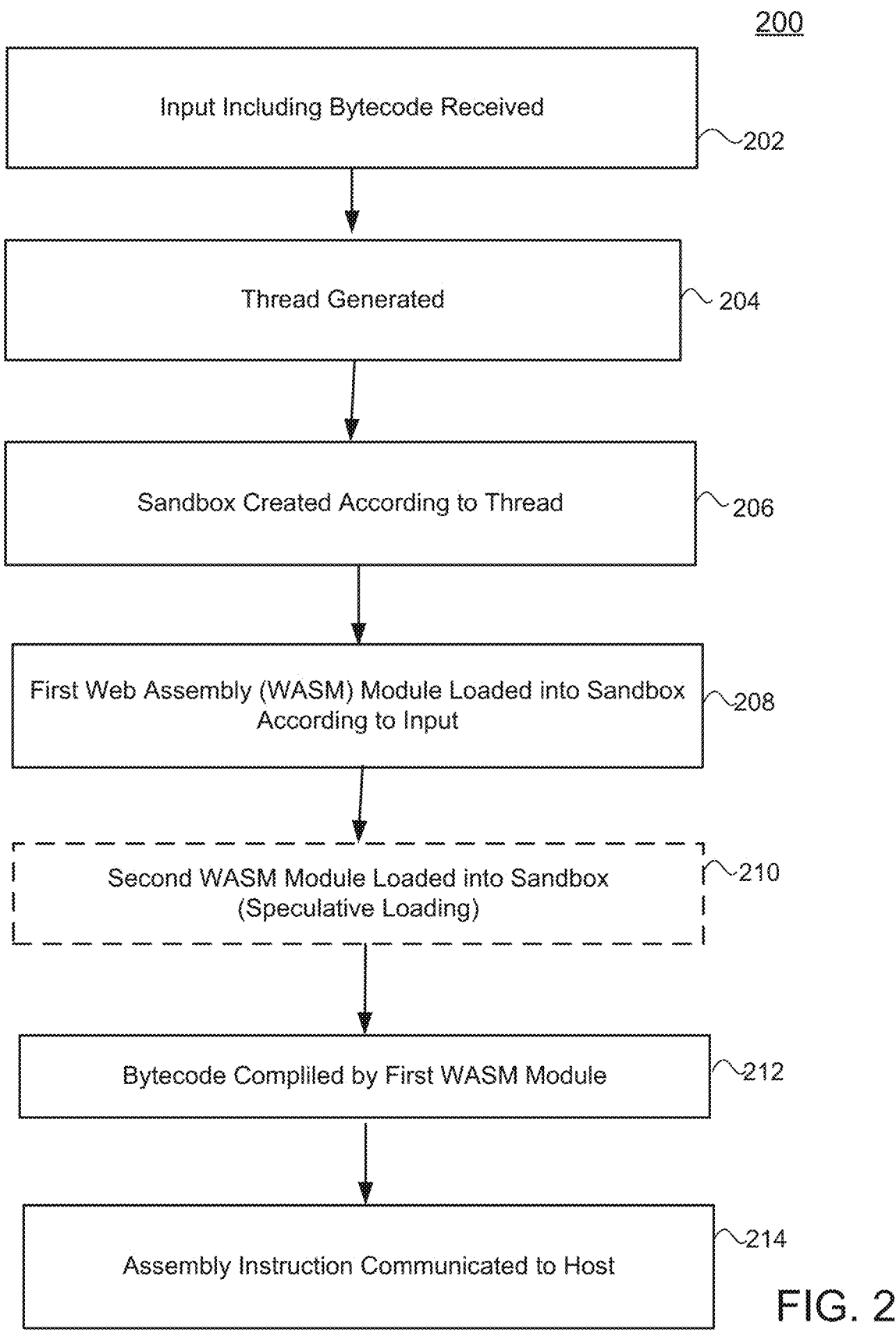
FIG. 2 shows a simplified flow diagram of a method according to an embodiment.

FIG. 2 is a flow diagram showing various actions taken in a method 200 according to an embodiment. At 202, an input including a bytecode is received from a host. Typically, the input also further comprises additional argument(s) referenced in compilation efforts.

At 204, a thread is generated by based upon the input. At 206, a sandbox compilation environment is created according to the thread.

At 208, first web assembly (WASM) module is loaded into the sandbox according to input.

At 210, according to an optional speculative loading, a second WASM Module is loaded into the sandbox. That second WASM module may be utilized for later expected compilation efforts.

At 212, the WASM module compiles the bytecode into assembly instructions. At 214, the assembly instructions are communicated back to the host via an interface to a network.

Further details regarding specific embodiments, are now provided in connection with a particular example utilizing the Web Assembly binary format of a compilation target for high level languages.

EXAMPLE

Web Assembly (also known as WASM) is a low-level bytecode for the web. It is designed as an abstraction for underlying hardware architecture, and runs on isolated sandboxed environment, affording platform independence for programmers.

Many high level languages (such as C, C++, RUST) can also be converted to WASM. Such use of Web Assembly offers near-native speed of execution by leveraging common hardware capabilities.

While useful, the Java software language does not address the process of using standard bytecode, a common compiler for many higher level languages. Accordingly, embodiments rely upon Web Assembly to provide a platform-independent, cross compilation target for many languages at high speed.

Figure 3:
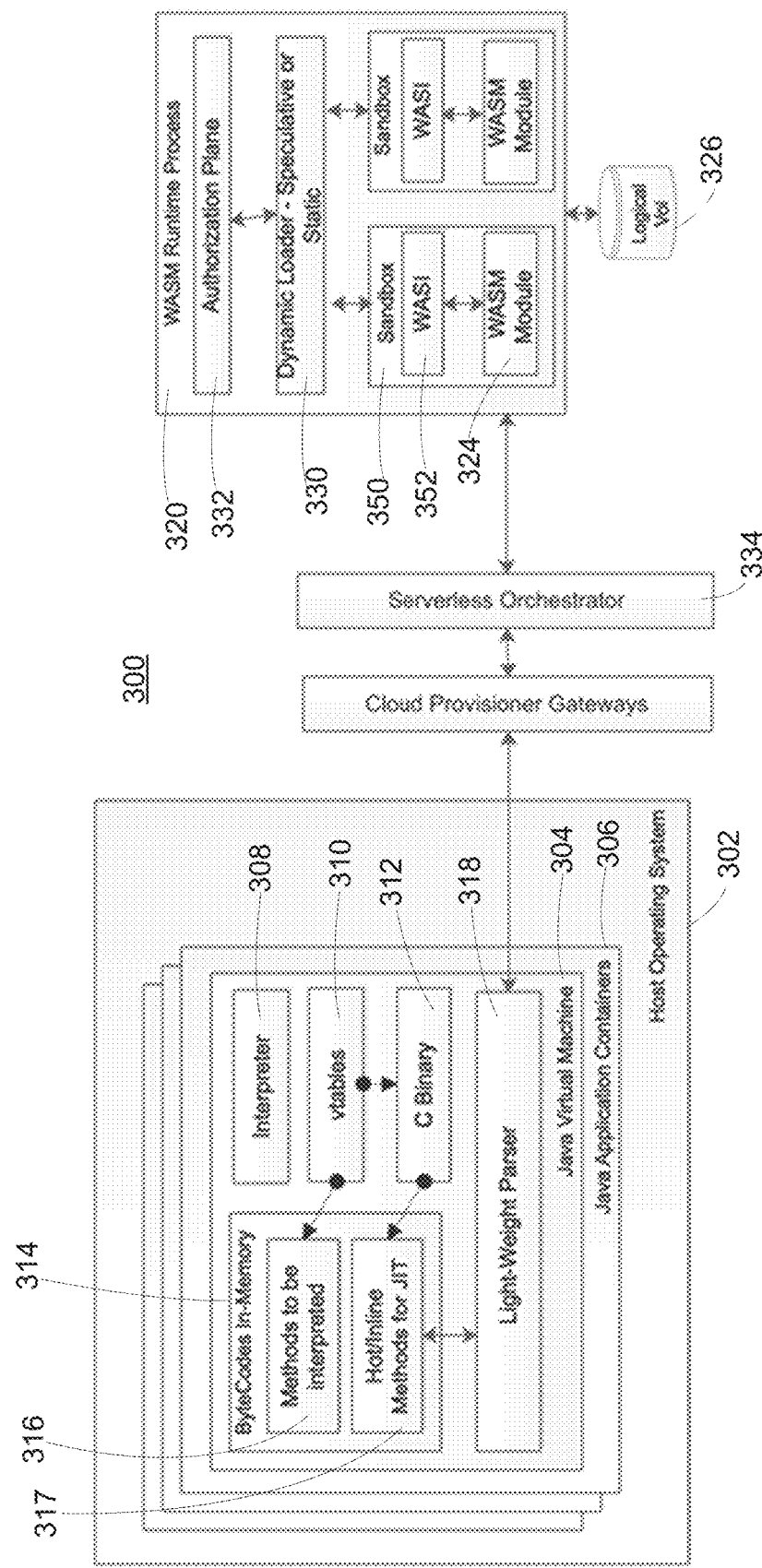
FIG. 3 shows a simplified view of an architecture of a specific example implementing delegation of bytecode runtime compilation utilizing the Web Assembly environment.

With the advent of WASM, major software companies agreed on a standard byte code and formed an active community group (W3c). The Web Assembly platform has been significantly evolving and undergoing design improvements. One example is Garbage collection, which allows for parallelism via threads FIG. 3 shows a simplified view of an architecture 300 of a specific example implementing delegation of bytecode runtime compilation utilizing Web Assembly. In particular, the host operating system 302 includes a Java Virtual Machine 304 within a Java application container 306.

The Java Virtual Machine includes an interpreter 308 whose function is to compile bytecodes of methods into executable codes. This compilation is a relatively time-consuming process, involving on the order of hundreds of optimizations per bytecode.

To alleviate this compilation burden, according to embodiments the JVM detects that the number of calls for a particular method (here method X) have exceeded a threshold. That is the method X is declared to be "hot". Alternatively, such triggering of "hot" status for a method can be accomplished manually by developers passing flags to the JVM.

At this point, the JVM decides to either:
- have the local interpreter compile bytecode of method X to optimized machine code, or
- perform a JIT operation for the hot method X According to embodiments, rather than compiling the bytecode to an optimized assembly itself, the JVM instead decides to offload that compilation task to a JIT-as-a-Service (JITaaS), that is offered as part of a PaaS.

Whenever the JVM declares a method to hot/inline, it connects to the vtables 310 (vtables references) of the hot methods. These vtables are modified to point to a compiled C binary 312. This is a trampoline code which calls the WASM pipelined functions.

The C binary points to the bytecode 314. When the hot methods 316 to be interpreted are executed, according to embodiments the C binary calls the JIT-WASM functions.

Here, the byte_code_offloader 317 modifies the vtable entry for method X. This entry points to a C code (the trampoline code)

The byte_code_offloader calls the light_weight_parser(X) 318 and checks the state of the JVM. The offloader collects the metadata for method X, and runtime specific information, etc.

In this particular example, the light weight parser (part of the trampoline code), scans the bytecode and creates a list of dependencies for the method X that is to be compiled. The light weight parser passes a graph (e.g., Directed Acyclic Graph) back to the byte_code_offloader, for transfer to the WASM runtime.

Data Transfer from a JVM to a WASM runtime according to this example, is now discussed. The first argument that is passed to the runtime is the bytecode of the hot-code (a byte array).

Apart from the bytecode, however, JIT executed as a WASM, needs multiple other arguments. Such other arguments can include but are not limited to:
the offsets of dependent functions (which is fetched from the vtables),
  metadata of the vtables,
  runtime specific information,
  JVM state, and
  others.

If the WASMs are supplied with the bytecodes only, then the JIT eventually requests the additional argument information. This can undesirably result in much back-and-forth communication between the Host and the WASM runtime. (Under some circumstances, a cost of 300% CPU cycles or more for this back-and-forth has been observed, as the CPU ends up sending the additional argument information to JIT over network).

Accordingly, in order to avoid inefficient consumption processing/network resources, embodiments (such as in this example) may provision a light-weight bytecode parser at the host layer. That parser:
1. parses the bytecode,
2. obtains all the dependencies, and
3. initially passes all required arguments together with the bytecode to the WASM runtime.
The parsing results may be cached in order to conserve CPU cycles.

After collecting all the information which will be needed by the JIT as a Service, the trampoline C method collects the argument list from byte_code_offloader. A socket is created.

Next, the bytecode and arguments are passed over a network to the pipelined WASM runtime 320. The offloading process assumes a network operating high network speeds.

Details regarding WASM runtime are now described. Traditionally, WASMs were executed within the browser process. According to embodiments, the WASM runtimes run as a separate process which executes a given WASM function using a thread.

The WASM runtime process can be provisioned with a VM or container. Alternatively, a WASM can also be executed outside browsers, standalone on a bare machine or host operating system, where the runtimes are accompanied with interfaces which can facilitate system calls.

Here, the configured JIT-as-a-Service is called 322 with all of the necessary/required arguments. An example is URLofJIT/compile-opto/{Argument Array in JSON}.

Next, the WASM runtime running for JIT-as-a-Service, receives a call for/compile-opto/{Arguments}. Then, the WASM runtime invokes the responsible WASM files.

The WASM runtime initially loads the collector and initiator WASM file with a single thread. This WASM function plans out the types and number of different optimizations (e.g., in the hundreds) that are to be performed over the received byte code.

The initiator module makes another call to localhost/final-JIT/{Arguments}. There, the arguments also include the dependency of WASM modules. These are responsible for other optimization in a graph.

The WASM runtime now loads and invokes the WASM modules 324 in a pipelined fashion, with a single thread. The WASM modules are loaded from the logical volume 326.

The role of WASM modules and pipelining, is now discussed. In particular, the server-side opto compiler of the JIT environment, performs on the order of hundreds of optimizations, while prototyping the optimization functions are converted to WASM modules.

Based upon the dependencies amongst WASM modules (e.g., as indicated by the light-weight parser), embodiments may pipeline the WASMs as using queues. Now, the pipelined WASMs are executed with a single thread over a runtime process.

This pipelining aspect facilitates the highly parallel manner of compiling the bytecode. The pipelined WASMs are called by the runtime process, and are accessible by the JVMs running over multiple application containers.

Turning now to discuss loading of the WASM modules to the runtime from logical volume storage, this exemplary runtime has a dynamic WASM loader 330 that is in communication with an authorization plane 332. That dynamic loader offers capabilities which can load new WASM functions directly to memory without restarting the runtime process (see the discussion of the cold start problem later below).

This dynamic loading property may be understood as follows. Suppose there is a change in code of a function implemented on the database layer, or additional functionality is introduced at the database layer. These changes must automatically be compiled into WASM modules and seamlessly integrated into the runtime.

Each runtime stores the WASM function to API mapping as key-values. The WASM function may be persisted.

Whenever a user registers a new WASM function with any of the runtimes, the user makes an API call. In this API call, the serverless orchestrator 334 makes another API call to runtime. The runtime performs dynamic loading of the WASM modules and registers the new WASM function and the new API in a key-value store.

Dynamic loading may further feature a speculative loading aspect. In FIG. 3, the Dynamic Loader loads the WASM modules (as, and when) a API request arrives.

The dynamic loader directly updates the WASM mapping table in memory. This prevents a runtime process restart.

The runtime also offers static loading and speculative loading. In static loading, the runtime loads the WASM modules only when a request arrives. After the request is executed, the runtime tears down the WASM module.

Static loading can be resource-consuming to perform. In particular, the possible number of WASM functions can be enormous.

Accordingly embodiments such as in this example, feature a speculative loading capability. That speculative loading may be advantageously used to predict in advance when to load the WASM modules to the runtime from the logical volume.

One such speculative loading approach may leverage a type of recurrent neural network such as Long-Short term memory (LSTM). LSTM is light weight and predicts loading of a WASM module by analyzing a time series log.

In speculative loading according to the instant example, a user/customer has the option to select specific WASM modules to be loaded from speculation or prediction. Each WASM module selected to be loaded from time-series predictions, has a LSTM bound to it. The LSTM intercepts the access log (in time-series format) and signals the loader to load the WASM.

Once loaded, each optimization WASM module performs the optimization on the bytecode and passes the output to next WASM module in the pipeline. This passing may use export-import mechanisms.

This example utilizes the EMSCRIPTEN toolchain to port C, and C++ applications to WASM format. The EMSCRIPTEN performs various abstraction tasks, including but not limited to:

emulating a file system;
memory management,
wrapping OpenGL to WebGL, and
alleviating differences so general code can be compiled with relatively few changes.

Further details regarding operation of the WASM modules is now discussed. Each WASM module gets executed with a separate thread. Each thread is monitored with a timer to control the resources while executing the thread.

Each WASM module executes in its on continuous memory heap, e.g., sandbox 350. Each WASM sandbox executes on a hardware enclave. The WASM sandboxes pass data to other WASM sandboxes using import-export functionality.

The runtime takes care of controlled access of file descriptor to WASM sandboxes. Also the runtime takes care of providing access of system calls to any given WASM sandbox in a controlled way.

Accordingly, embodiments may desirably offer resource isolation with WASM runtime in order to allow multi-tenant offloading of JIT compilation functions. Specifically, the Web-Assembly based execution runtimes offers a sandboxed execution environment. The WASM runtime creates a continuous memory heap for each sandbox, and no pointers from outside the sandbox can access the heap.

In order to allow system calls for instructions executing inside the sandbox, during compilation of WASM, the pointer is detected. Offsets can be passed to any interfaces which allow system interactions. One such interface is the Web-Assembly System Interface (WASI) 352.

The need for such a system interface is recognized when the WASM functions are executed outside the browser. Further, with the threaded model (where each thread executes a WASM function) CPU isolation is also achieved.

The delegated runtime compilation according to embodiments achieves filesystem isolation, by separating disks and mounting disks for each runtime process. Further, on the principles of capability-based security the runtime assigns file descriptors (fds) to WASM functions in a controlled manner.

The last WASM optimization module outputs the final assembly to the initiator WASM module (/compile-opto/S{Assembly}). The WASM runtime destroys the thread that was originally invoked to call the WASM optimization modules in the pipeline.

Once the pipelined WASM functions are executed, the WASM signals true back to the JVM. The initiator WASM module then returns the optimized assembly code, to the initial JVM caller. The compiled assembly is sent back from the WASM sandbox to the target JVM.

In particular, the WASM function uses the WASI in order to create sockets or perform system calls. The underlying runtime performs system calls through WASI to perform encryption/decryption/compression/decompression. It is noted that two WASM modules can talk to each other by export-import methods, as per WASI standards.

The WASM functions may access REST APIs of any cloud service over SSL or encrypted channels. The system interface (such as WASI) allowing WASM modules to make system calls, also initiates calls for encryption/decryption and compression/de-compression methods running on the host. The host itself is responsible for intercepting the data, and then performing encryption/decryption or compression/de-compression.

Finally, the trampoline code receives the assembly code from the WASM runtime. That is, after execution of the functions, the WASM runtime returns back the compiled assembly instructions.

Embodiments may cache the assembly instructions. The vtables of the hot methods may again be modified to point to the cached assembly instructions with appropriate memory offsets.

The trampoline code modifies the vtable entry of the hot method X, to point to the new received assembly code. Thus, rather than locally interpreting the bytecode of the hot method X, embodiments have the JVM directly execute the assembly code by updating the references. This is a much faster process than interpreting the bytecode.

Certain aspects of the instant example may merit particular attention. One is the issue of cold-start with containers.

Basically, cold start occurs when a cloud function is invoked for the first time (or after a long time). This is an issue because when a serverless application scales up to a level, one of the workers has to assign a container and start the application.

This assignment and starting process involves downloading of files, applying settings, loading the code module, and running it. The container will be intact for some period of time. When another event occurs after that which requires space, the existing container may be destroyed or taken off the memory by writing the states.

When the container is taken off the memory, and a new API requests arrives for the same service, the container needs to be re-loaded. This can cause delay every time in re-loading.

Usually the flow of invoking a function provisioned through a container may involve: resource provisioning, getting the container up, starting functions, and then executing functions. However, the WASM execution model does not require a container to be instantiated (avoiding cold start problems). Alternatively a container can directly be executed on bare systems having proper WASM runtime supports.

While the above example has focused upon use in connection with Java, embodiments are not so limited. Alternative embodiments can be employed for other language runtimes (such as Ruby or Python) or other runtimes which use JIT, such as an Extended Berkeley Pocket Filter (EBPF) program.

It is noted that the performance benefits conferred by embodiments, may provoke intrusion by malware authors. However, WASM follows a linear memory model similar to languages such as C, C++.

That linear memory model instructs dynamic memory allocations via a memory allocator. Opcodes accessing memory are not given addresses—instead offsets to the beginning of linear segment is known. In this manner the linear memory is sandboxed and isolated from other data structures and concurrent processes.

Other Security features may be offered according to various embodiments. One security feature is the separation of the execution stack from the memory heap. This avoids buffer overflow-type attacks)

Another possible security feature that may be afforded by embodiments, is a lack of direct references to function pointers to control the instruction pointer. This helps to ensure the Control Flow Integrity (CFI).

Still another possible benefit potentially offered by embodiments, is a lack of access to system calls by default. This exposes only needed file descriptors to the specific WASM module. This feature is similar to capability based security models, and considerably reduces the attack surface.

It is noted that debugging of the compiled target language (by matching resulting code to actual code) is not rendered more difficult by delegation according to embodiments. Since Web Assembly is also built to interact with other languages, it can leverage developed solutions. Web Assembly may use the same source maps for easy debugging by mapping generated code to original code representation.

Returning to FIG. 1, there the particular embodiment depicted with the engine responsible for loading the WASM modules to the WASM runtime as being located outside of the logical volume of the storage layer. However, this is not required.

Rather, alternative embodiments could leverage the processing power of an in-memory database engine (e.g., the in-memory database engine of the HANA in-memory database available from SAP SE), in order to perform various functions. For example, the in-memory database engine could perform the speculative loading as described above.

Figure 4:
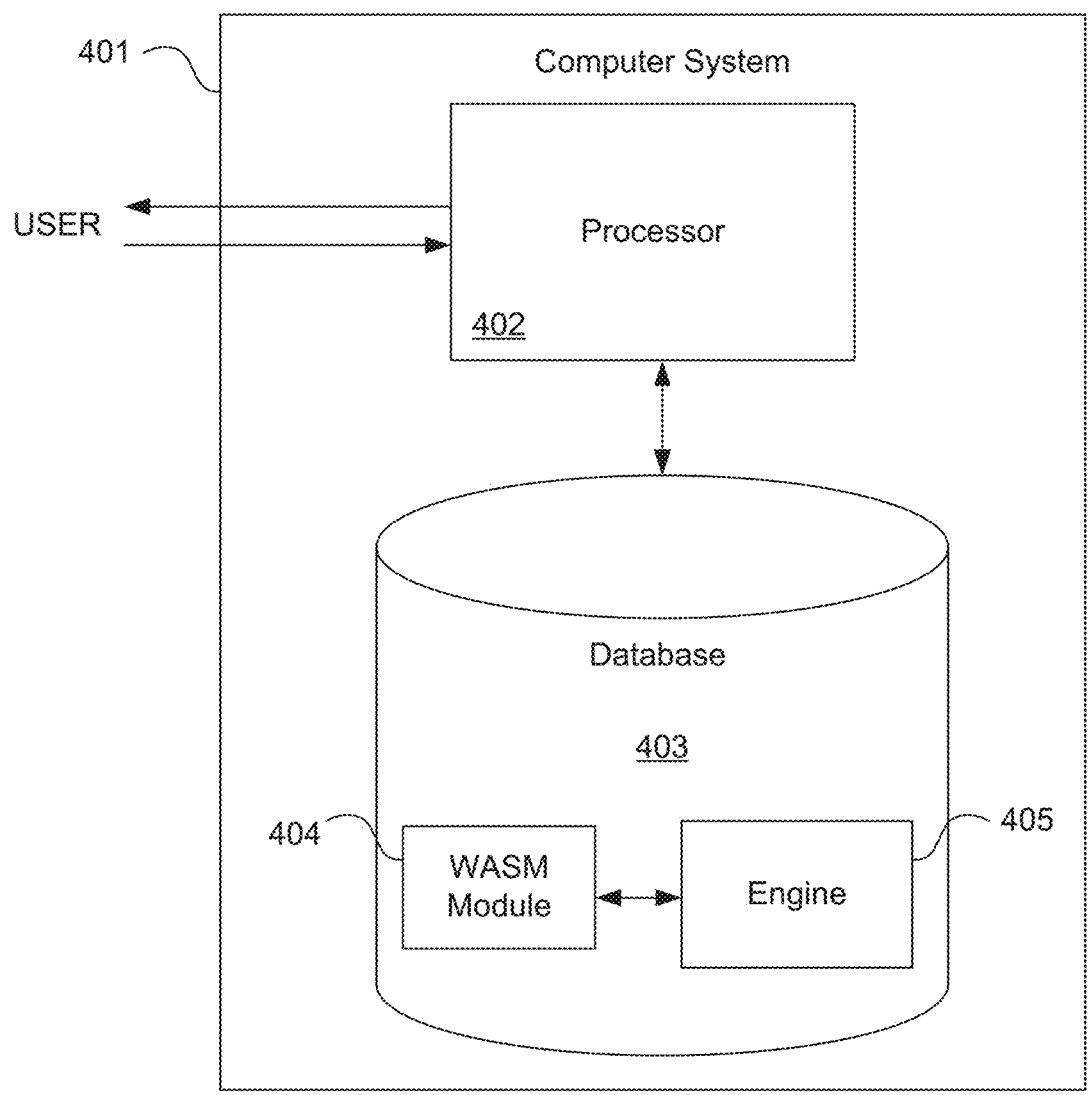
FIG. 4 illustrates hardware of a special purpose computing machine according to an embodiment that is configured to implement delegation of bytecode compilation.

Thus FIG. 4 illustrates hardware of a special purpose computing machine configured to implement offloading of bytecode runtime compilation according to an embodiment. In particular, computer system 401 comprises a processor 402 that is in electronic communication with a non-transitory computer-readable storage medium comprising a database 403. This computer-readable storage medium has stored thereon code 405 corresponding to an engine. Code 404 corresponds to a WASM module. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 5:
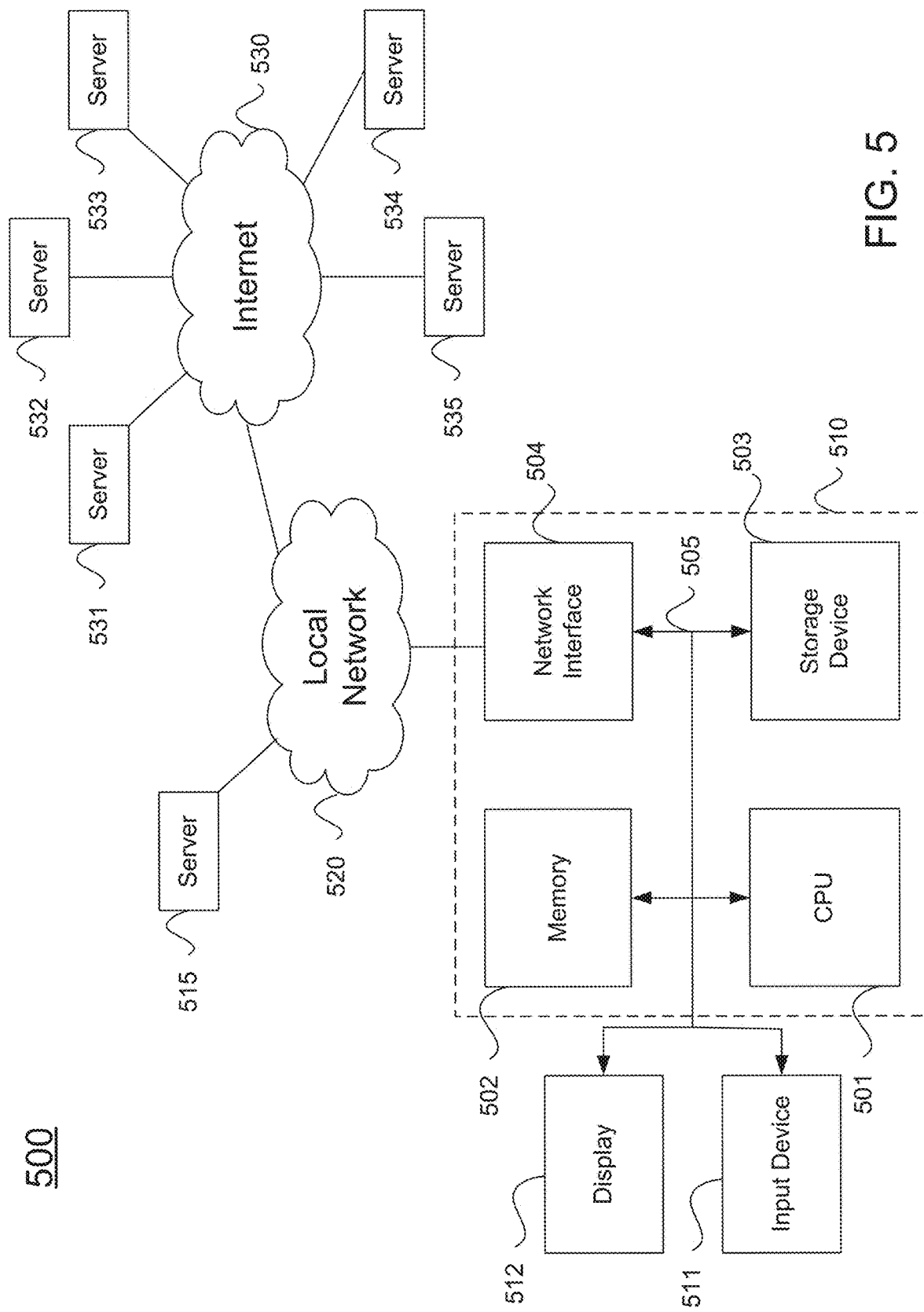
FIG. 5 illustrates an example computer system.

An example computer system 500 is illustrated in FIG. 5. Computer system 510 includes a bus 505 or other communication mechanism for communicating information, and a processor 501 coupled with bus 505 for processing information. Computer system 510 also includes a memory 502 coupled to bus 505 for storing information and instructions to be executed by processor 501, including information and instructions for performing the techniques described above, for example. This memory may also be used for storing variables or other intermediate information during execution of instructions to be executed by processor 501. Possible implementations of this memory may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 503 may include source code, binary code, or software files for performing the techniques above, for example. Storage device and memory are both examples of computer readable mediums.

Computer system 510 may be coupled via bus 505 to a display 512, such as a cathode ray tube (CRT) or liquid crystal display (LCD), for displaying information to a computer user. An input device 511 such as a keyboard and/or mouse is coupled to bus 505 for communicating information and command selections from the user to processor 501. The combination of these components allows the user to communicate with the system. In some systems, bus 505 may be divided into multiple specialized buses.

Computer system 510 also includes a network interface 504 coupled with bus 505. Network interface 504 may provide two-way data communication between computer system 510 and the local network 520. The network interface 504 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 504 sends and receives electrical, electromagnetic, or optical signals that carry digital data streams representing various types of information.

Computer system 510 can send and receive information, including messages or other interface actions, through the network interface 504 across a local network 520, an Intranet, or the Internet 530. For a local network, computer system 510 may communicate with a plurality of other computer machines, such as server 515. Accordingly, computer system 510 and server computer systems represented by server 515 may form a cloud computing network, which may be programmed with processes described herein. In the Internet example, software components or services may reside on multiple different computer systems 510 or servers 531-535 across the network. The processes described above may be implemented on one or more servers, for example. A server 531 may transmit actions or messages from one component, through Internet 530, local network 520, and network interface 504 to a component on computer system 510. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
receiving from a host, an input comprising a bytecode, a directed acyclic graph, and an additional argument;
in response to the input, generating a thread;
using the thread to create a sandbox including an interface;
loading a first Web-Assembly (WASM) module from a database into the sandbox, based upon the input;
the WASM module compiling the bytecode into an assembly instruction according to the input including the directed acyclic graph;
the interface communicating the assembly instruction to a network;
loading a second WASM module to compile additional source code from the database based on historical context information associated with the bytecode; and
wherein the additional argument is provided by a parser located at the host.

2. A method as in claim 1 wherein:
the bytecode is sent from a virtual machine at the host; and
the additional argument comprises a state of the virtual machine.

3. A method as in claim 1 wherein:
the bytecode is sent from a virtual machine at the host; and
the additional argument comprises metadata of a vtable.

4. A method as in claim 1 wherein the additional argument comprises an offset of a dependent function.

5. A method as in claim 1 wherein the additional argument comprises runtime-specific information.

6. A method as in claim 1 wherein:
the database comprises an in-memory database; and
the loading is performed by an in-memory database engine of the in-memory database.

7. A non-transitory computer readable storage medium embodying a computer program for performing a method, said method comprising:
receiving from a host, an input comprising a bytecode, a directed acyclic graph, and an additional argument;
in response to the input, generating a thread;
using the thread to create a sandbox including an interface;
loading a first Web-Assembly (WASM) module from a database into the sandbox, based upon the input;
the WASM module compiling the bytecode into an assembly instruction according to the input including the directed acyclic graph;
the interface communicating the assembly instruction to a network;
loading a second WASM module to compile additional source code from the database based on historical context information associated with the bytecode; and
wherein the additional argument is provided by a parser located at the host.

8. A non-transitory computer readable storage medium as in claim 7 wherein the additional argument comprises an offset of a dependent function, or runtime-specific information.

9. A non-transitory computer readable storage medium as in claim 7 wherein:
the bytecode is received from a virtual machine at the host; and
the additional argument comprises a state of the virtual machine, or metadata of a vtable at the host.

10. A non-transitory computer readable storage medium as in claim 7 wherein:
the database comprises an in-memory database; and
the loading is performed by an in-memory database engine of the in-memory database.

11. A computer system comprising:
one or more processors;
a software program, executable on said computer system, the software program configured to cause an in-memory database engine of an in-memory database to:
receive from a host, an input comprising a bytecode, a directed acyclic graph, and an additional argument;
in response to the input, generate a thread;
use the thread to create a sandbox including an interface;
load a first Web-Assembly (WASM) module from a database into the sandbox, based upon the input;
cause the WASM module to compile the bytecode into an assembly instruction according to the input including the directed acyclic graph;
cause the interface to communicate the assembly instruction to a network;
loading a second WASM module to compile additional source code from the database based on historical context information associated with the bytecode, and
wherein the additional argument is provided by a parser located at the host.

12. A computer system as in claim 11 wherein the additional argument comprises an offset of a dependent function, or runtime-specific information.

13. A computer system as in claim 11 wherein:
the bytecode is received from a virtual machine at the host; and
the additional argument comprises a state of the virtual machine.

14. A computer system as in claim 11 wherein the additional argument comprises metadata of a vtable at the host.

* * * * *